Sept. 4, 1928.

T. APPLEBY 1,683,012

CONTROL METHOD AND APPARATUS

Filed Dec. 31, 1921

3 Sheets-Sheet 1

INVENTOR

Thomas Appleby
Cornelius D. Ehret
BY his ATTORNEY.

Sept. 4, 1928.
T. APPLEBY
1,683,012
CONTROL METHOD AND APPARATUS
Filed Dec. 31, 1921
3 Sheets-Sheet 2
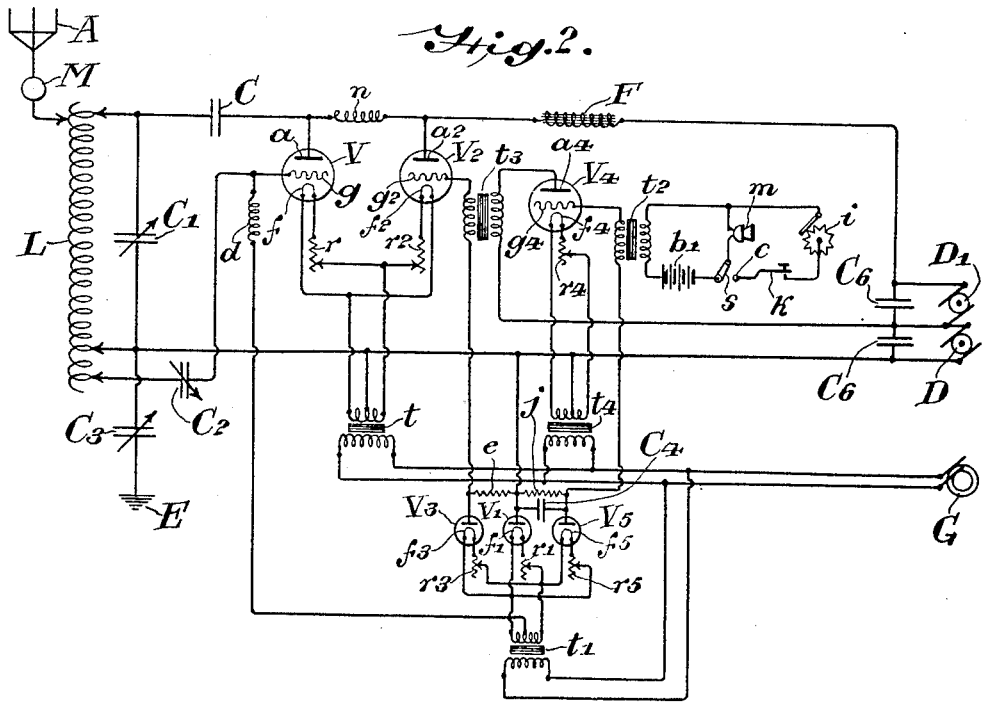
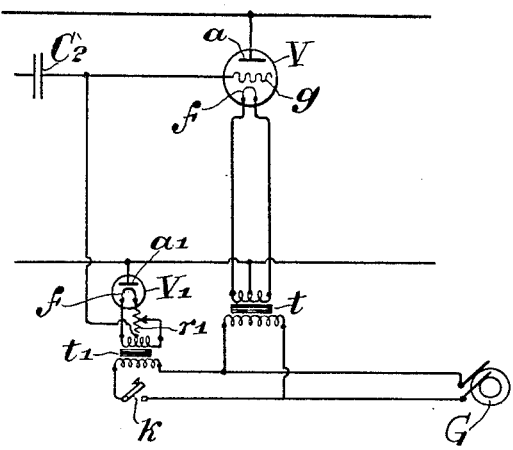
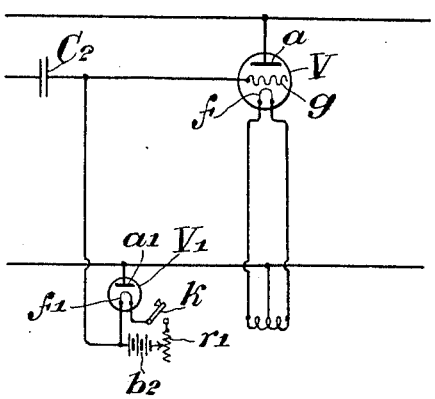
INVENTOR
Thomas Appleby
Cornelius D. Ehret
BY
his ATTORNEY.

Sept. 4, 1928.  T. APPLEBY  1,683,012
CONTROL METHOD AND APPARATUS
Filed Dec. 31, 1921   3 Sheets-Sheet 3

INVENTOR
Thomas Appleby
BY Cornelius D. Ehret
ATTORNEY.

Patented Sept. 4, 1928.

1,683,012

UNITED STATES PATENT OFFICE.

THOMAS APPLEBY, OF PHILADELPHIA, PENNSYLVANIA, ASSIGNOR TO ARTHUR ATWATER KENT, OF ARDMORE, PENNSYLVANIA.

CONTROL METHOD AND APPARATUS.

Application filed December 31, 1921. Serial No. 526,123.

My invention relates to a method of and apparatus for controlling thermionic action, including thermionic action in controlling electric currents or potentials, production of oscillations, etc.

In accordance with my invention, the action of a thermionic device is controlled by controlling by thermionic action a circuit including the grid or control electrode or equivalent of a thermionic device.

More particularly, in accordance with my invention, I include in a circuit of the grid or control electrode or equivalent of a thermionic device a second thermionic device and adjust its impedance, as to optimum or any other desired condition, by adjustment of the temperature of the cathode of the second thermionic device; or by controlling the potential of or otherwise controlling or affecting the grid, control electrode or equivalent of the second thermionic device; or both.

My invention resides in the method and apparatus hereinafter described and claimed.

Figure 1:
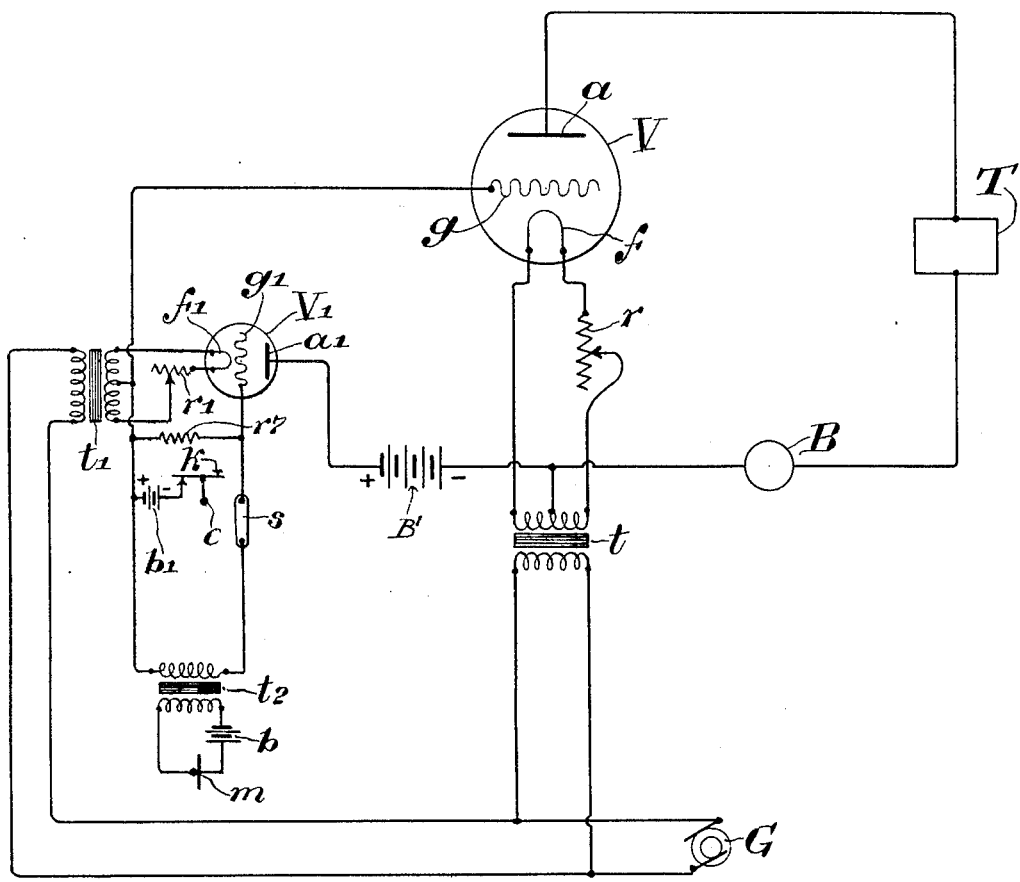

For an understanding of my invention and for an illustration of some of the many forms my apparatus may take, reference is to be had to the accompanying drawings, in which:

Fig. 1 is a diagrammatic view of devices and circuit arrangements embodying my invention.

Figs. 2 to 7 inclusive are diagrammatic views of other forms my invention may take.

Referring to Fig. 1, V is a thermionic device, such as an audion, pliotron or the like, or any equivalent thermionic device, comprising an anode $a$ and a cathode or filament $f$, generally disposed within a chamber evacuated to very high degree, for pure electron discharge, or to lesser degree leaving substantial quantities of gas or vapor, or a mixture of them. Associated with the anode and cathode is any suitable control electrode or equivalent. In the example illustrated, there is provided a grid $g$.

In the anode circuit is any suitable source of current or potential B, such as a source of direct, alternating or fluctuating current. In the anode circuit is connected also any suitable translating device T, as a telephone, galvanometer, indicator, or any other device responsive to or controlled by a change in current or potential.

The grid $g$ is included in a circuit with the cathode or filament $f$. In this circuit is a source of potential or current $B^1$ and a second thermionic device $V^1$ having the anode $a^1$ and the cathode or filament $f^1$, the filament $f^1$ and the positive terminal of the source $B^1$ being presented to the grid $g$.

The filaments or cathodes $f$ and $f^1$ may be heated by current from any suitable source or sources, as for example, from a battery, or preferably, as indicated, from the source of alternating current A through the transformers $t$ and $t^1$, usually step-down transformers, the mid points of the secondaries of these transformers being the points of connection to the cathodes. In series with the cathodes $f$ and $f^1$ are the adjustable resistances $r$ and $r^1$ for changing the strengths of the currents traversing the filaments, and therefore changing or adjusting their temperatures.

By adjusting the resistance $r^1$ in the circuit of the cathode $f^1$, its temperature is varied, with the result that the impedance of the thermionic device $V^1$ is varied, and consequently, the effect of the grid $g$ upon the anode circuit of the thermionic device $V$ is varied, with resultant change or variation in effect of the anode circuit upon the translating device T. The resistance $r^1$ may be adjusted to any suitable value, and particularly to an optimum value for obtaining a critical or any other predetermined condition of or effect by the grid $g$.

With the thermionic device $V^1$ and the source $B^1$ connected in the sense indicated in Fig. 1, an increase of current in the cathode $f^1$, that is, an increase in temperature of the cathode $f^1$, will reduce the impedance in the circuit of the grid $g$, with resultant increase of current in the anode circuit of the device V, as occurs when the potential of the grid $g$ becomes more highly positive. If the source $B^1$ and device $V^1$ are connected in reverse sense to that indicated in the drawing, the opposite effect will be produced in the anode circuit of the device V, as occurs when the potential of the grid $g$ is rendered more highly negative.

As an alternative or addition to the variation of the temperature of the cathode $f^1$, the device $V^1$ may be provided with any control electrode or equivalent, which in the example illustrated is a grid $g^1$, in a circuit between which and the cathode $f^1$, controlled by the switch $s$, is the secondary of a transformer $t^2$, in whose primary circuit is connected a battery $b$ and a microphone $m$. When sound waves or speech impinge upon the microphone $m$, the potential of the grid $g^1$ is varied in accordance with sound waves or speech, with a resultant similar variation of the impedance of the device $V^1$, and with corresponding effect upon the grid $g$ and therefore upon the current in the anode circuit of the device V. By throwing the switch $s$ to its other position in engagement with the contact $c$, there is brought into the circuit of the grid $g^1$ a key or other switching or signaling instrument $k$, which controls variation of the potential of the grid $g^1$ by the battery or source of current $b^1$, with corresponding effect upon the thermionic device $V^1$, and therefore upon the grid $g$ and the current of the anode circuit of the device V.

Referring to Fig. 2, V is a thermionic device having anode $a$, grid $g$ and cathode $f$ associated with circuits for producing oscillations, particularly high frequency oscillations utilizable for radio systems or for high frequency carrier wave systems utilizing conductors extending between stations. In the example illustrated, C, $C^1$, $C^2$ and $C^3$ are condensers; and L is an inductance, variable portions of which are included between the antenna or radiating structure A (which may also represent a conductor extending between stations), and earth or counter-capacity or return conductor E. Variable portions of the inductance L are also included with the grid and anode circuits of the device V, the circuit illustrated being one well known in the radio art, and is not per se part of my invention, but is exemplary merely. The cathode $f$ is supplied by current through the variable resistance $r$, the current being supplied by any suitable source as, for example, the source of alternating current G through the transformer $t$. The connection of a circuit of the grid $g$ to the cathode $f$ is made at the mid point of the secondary of the transformer $t$. Another circuit of the grid $g$, which may include the radio frequency choke coil $d$, is connected to a mid point of the secondary of the transformer $t^1$, energized by the source G, and delivering current through the adjustable resistance $r^1$ to the filament or cathode $f^1$ of the thermionic device $V^1$, whose anode is connected to the cathode $f$ of the device V through the mid point of the secondary of the transformer $t$. A thermionic modulator $V^2$ comprises anode $a^2$, grid $g^2$ and filament or cathode $f^2$ receiving current from the secondary of the transformer $t$ through the adjustable resistance $r^2$. In the circuit of the grid $g^2$ is connected a thermionic device $V^3$ whose cathode $f^3$ receives current through the adjustable resistance $r^3$ from the secondary of the transformer $t^1$, the cathode $f^3$ being connected through the mid point of the secondary of the transformer $t^1$ with the grid $g$ of the tube V. The grid $g^2$ is also connected through the high resistance $e$ with the cathode $f^2$ through the mid point of the secondary of the transformer $t$. In the circuit of the grid $g^2$ is the secondary of a transformer $t^3$, whose primary is in the anode circuit of the thermionic amplifier $V^4$ having the anode $a^4$, grid $g^4$, and filament or cathode $f^4$, the latter receiving current through the adjustable resistance $r^4$ from the secondary of a transformer $t^4$ energized by the source G. A connection is made from the mid point of the secondary of the transformer $t^4$ to the anode circuit of the device $V^4$ including the source of direct current D. In the circuit of the grid $g^4$ is the secondary of a transformer $t^2$ in whose primary circuit is the battery or other suitable source of current $b^1$ which, with the switch $s$ in the position indicated, is in circuit also with the microphone $m$. When the switch $s$ is thrown on to contact $c$, the key $k$ and tone wheel, interrupter or buzzer $i$ are brought into the primary circuit. In the circuit of the grid $g^4$ there is included also the thermionic device $V^5$, whose filament or cathode $f^5$ receives current through the adjustable resistance $r^5$ from the secondary of the transformer $t^1$; the grid $g^4$ being connected to the thermionic device $V^5$ and the mid point of the secondary of the transformer $t^1$ with the grid $g$ of the oscillator V. The grid $g^4$ is connected also through the high resistance $j$ with the cathode $f^4$ through the mid point of the secondary of the transformer $t^4$. Paralleling the resistance $j$, or connecting the anodes of the devices $V^1$ and $V^5$, is the condenser $C^4$.

Current is supplied to the anode circuits of the oscillator V and modulator $V^2$ by the aforesaid source D in series with a second source $D^1$, these sources being shunted by large capacity condensers $C^5$ and $C^6$, particularly when the sources D, $D^1$ are direct current generators with commutators. In series between the sources D, $D^1$ and the anodes of the devices V, $V^2$ is the low frequency choke coil F, and between the anodes $a$ and $a^2$ is connected the radio frequency choke coil $n$.

The thermionic device $V^1$, which may be connected in opposite sense when suitable or desirable, is a thermionic impedance in a grid leak circuit for the grid $g$ of the oscillator V. By suitably adjusting the resistance $r^1$, the temperature of the filament $f^1$ is adjusted to such value that there is an optimum value of impedance in such leak circuit, and such impedance, while conducting current, remains substantially constant, as distinguished from the case where metallic, carbon or other resistances are used instead of the device $V^1$.

Similarly, the thermionic device $V^3$ serves as an impedance between the grid $g$ and the grid $g^2$ of the modulator $V^2$, and when suitable or desirable, the sense of connection of the tube $V^3$ may be reversed. The potential of the grid $g^2$ is influenced through impedance $V^3$ by the grid $g$ of the oscillator V, the grid $g^2$ being biased to suitably high potential, as a negative potential, to effect more perfect modulation of the oscillations produced by the oscillator V and impressed upon the conducting or radiating structure A, as through an ammeter or other meter or indicator M.

Similarly, the grid $g$ of the oscillator V influences the grid $g^4$ of the amplifier $V^4$ through the thermionic device $V^5$, which when suitable or desirable, may be connected in reverse sense. By adjusting the resistance $r^5$, the temperature of the cathode $f^5$ is brought to suitable degree for imparting to its circuit an impedance suitable for imparting to the grid $g^4$ a suitable potential, as a high negative potential, derived from the grid $g$ of the oscillator V.

In the arrangement above described, the thermionic device $V^1$ serves as a grid leak circuit impedance for the tube V adjusted to optimum or critical value by the resistance $r^1$. The thermionic impedance $V^3$ and the resistance $e$ are in series with each other, in parallel to the impedance $V^1$, in the leak circuit of the grid $g$ of the tube V, and the grid $g^2$ of the modulator $V^2$ is connected to a point in the aforesaid grid leak circuit between the resistance or impedance $V^3$ and resistance $e$. Similarly, the thermionic resistance or impedance $V^5$ is in series with the resistance $j$, in parallel to the thermionic resistance or impedance $V^1$, in the leak circuit of the grid $g$ of the oscillator V, and the grid $g^4$ is therefore connected to the leak circuit of the grid $g$ at a point between the impedance $V^5$ and the resistance $j$.

The operation is as follows:

The tube V and its associated circuits, including the leak circuit of its grid $g$, produces oscillations, the impedance of the grid leak circuit being adjustable by adjusting the resistance $r^1$, the total resistance in the path from the grid $g$ to the cathode $f$ being that afforded by the impedance $V^1$, with $V^3$, $e$, and $V^5$, $j$ in parallel to $V^1$. Through the impedances $V^3$ and $V^5$, the grids $g^2$ and $g^4$ of the modulator $V^2$ and amplifier $V^4$ are biased by effects derived from the grid $g$ of oscillator V to suitably high negative potentials, without use of battery or separate source of current.

When the switch $s$ is in the position shown, the microphone $m$ is in circuit, and sound waves or speech impinging upon the microphone varies the potential of the grid $g^4$ in accordance with sound waves or speech, and this effect is amplified by the tube $V^4$, whose plate circuit through the transformer $t^3$ causes corresponding variation in the potential of the grid $g^2$, which correspondingly varies the impedance of the anode circuit of the modulator $V^2$, which, with decreasing impedance, robs the oscillator V of current supplied thereto through the choke coil F from the sources D, $D^1$, increase of impedance in the anode circuit of $V^2$ being accompanied by increase in amplitude of the oscillations produced by V. And with changes in amplitude of the oscillations in V, the effects produced by the grid $g$ through its leak circuit upon the grids $g^2$ and $g^4$ are correspondingly varied, with the result that there is in effect a triple modulation, whereby modulation of very high degree of the amplitude of the oscillations impressed upon the antenna A or conducting system represented thereby, is effected.

Similarly, with the switch $s$ thrown to the contact $c$, upon manipulation of the key $k$ there is effected, for each closure of the key, a plurality of substantially equal modulations of the potentials of the grids $g^4$ and $g^2$, with corresponding high degree of fluctuation of amplitude of the oscillations produced by V, the interrupter, buzzer or other device $i$ preferably producing effects at high frequency, for example, 500 or more per second, for telegraphic purposes.

While $V^2$ is referred to as a modulator and $V^4$ as an amplifier, $V^4$ is also in effect a modulator in that it modulates or controls the tube V, and an effect upon the grid $g^4$ of the modulator $V^4$ is derived from the grid $g$ of the oscillator V.

By the system described, so-called high power tubes, as V and $V^2$, are effectively controlled, and the thermionic devices $V^1$, $V^3$ and $V^5$ may be of relatively small capacities and are effective substitutes for wire, carbon or other types of resistance which, when traversed by substantial quantities of current, are heated and changed in resistance. By employment of thermionic resistances or impedances, however, the optimum adjustments are readily obtained and maintained substantially constant.

By way of example merely, and without limitation of my invention thereto, it may be stated that the tubes V and $V^2$ are of so-called 250 watt capacities or ratings; the amplifier tube $V^4$ may be of 50 watt rating or capacity; and the tubes $V^1$, $V^3$ and $V^5$ may each be of 5 watt rating or capacity, the resistance $e$ being of the order of 20,000 ohms and the resistance $j$ of the order of 10,000 ohms, and the condenser $C^4$ may have a capacity of about one microfarad. The iron core choke coil F may have an inductance of three henrys, and each of the sources D, $D^1$ may have a voltage of 1250 volts, whereby 2500 volts are impressed upon the anode circuits of V, $V^2$ and 1250 volts upon the anode circuit of the tube $V^4$. The condensers $C^6$ may each have a capacity of two microfarads for smoothing out the commutator ripples of the generators D and $D^1$. With a set of these proportions, and with an antenna A of 150 feet length, and a radiation resistance of six ohms, I have procured in the antenna an oscillatory current of six amperes, the energy being 216 watts, and with modulation of very high degree and yielding excellent articulation in the case of transmission of sound waves or speech.

In other words, by my arrangement high power tubes are readily controllable by small capacity thermionic impedances or resistances.

In Fig. 3, the tube V may be a thermionic oscillator, or employed in other relations or for other purposes. In a circuit of the grid $g$ is the thermionic device $V^1$, which, by the adjustment of the resistance $r^1$, is brought to suitable, optimum or critical magnitude, and in this case such impedance is controlled by the switch or key $k$ in the primary of the transformer $t^1$, the filament $f$ receiving current only when the key or switch $k^1$ is closed.

In Fig. 4 there is a similar arrangement, but in this case the circuit of the filament $f^4$ includes a battery $b^2$ and adjustable resistance $r^1$, the filament $f^4$ receiving current only when the key or switch $k$ is closed.

Figure 5:
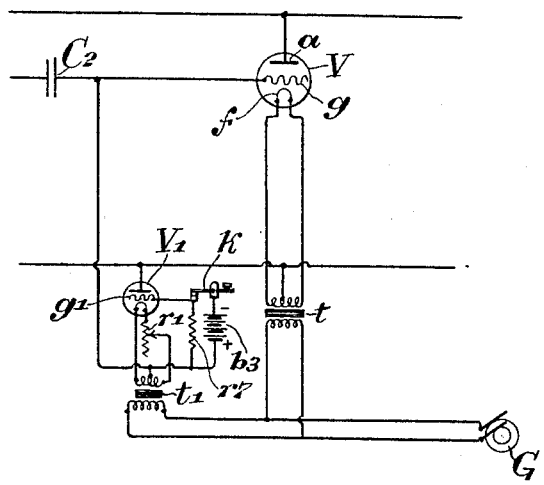

In Fig. 5 there is a generally similar arrangement in which the tube $V^1$ is provided with a grid $g^1$ whose circuit, including the grid biasing battery $b^3$, is controlled by the key $k$, which upon closure of its back contact renders the potential of the grid $g$ negative, with the result that the impedance of the tube $V^1$ is high. In other words, upon depressing the right end of the key $k$ for a telegraphic signal, the tube V produces oscillations, but when the key closes at its back contact, oscillations are prevented or reduced in amplitude.

Figure 6:
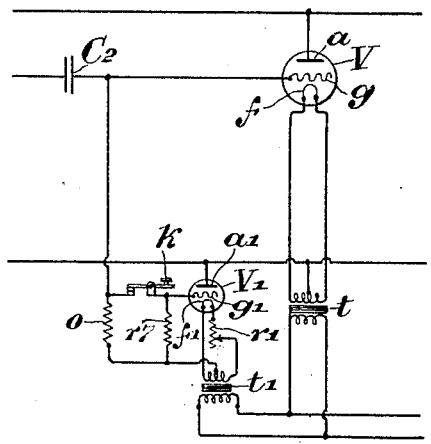

In Fig. 6 there is a generally similar arrangement, in which the grid circuit impedance $V^1$ has a grid $g^1$, which upon closure of the key $k$ at its back contact is brought to a negative potential, as effected by the resistance $o$, whose magnitude is sufficient to cause the grid $g^1$ to assume a potential which is negative with respect to the cathode $f^1$. Here again, upon depression of the right end of key $k$, the impedance $V^1$ is reduced and the oscillator V produces oscillations which cease or are reduced in amplitude when the key $k$ closes circuit at its back contact.

Figure 7:
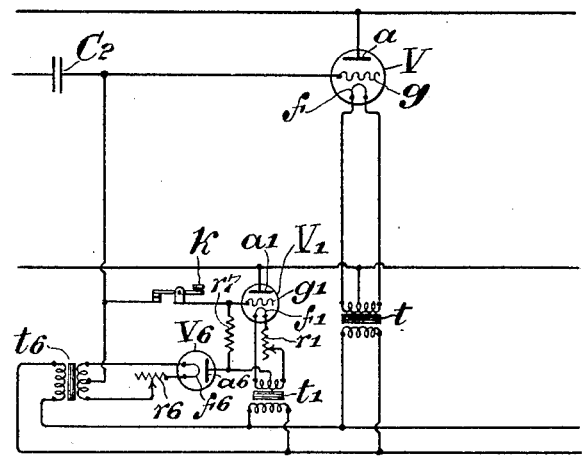

In Fig. 7 there is a generally similar arrangement, except that there is in series with the thermionic impedance $V^1$ a second thermionic impedance $V^6$ having anode $a^6$ and filament $f^6$ receiving current from the transformer $t^6$ through the adjustable resistance $r^6$. The grid $g^1$ is connected through the back contact of the key $k$ with the cathode $f^6$, whereby the grid $g^1$ is given a negative potential, the impedance $V^6$ in effect corresponding with the impedance or resistance $o$ of Fig. 6. When the right end of the key $k$ is depressed, the impedance in the tube $V^1$ is reduced, and when the key closes a grid circuit at its back contact the impedance is increased, thereby preventing oscillations or reducing their amplitude as regards the tube V.

In Figs. 1, 5, 6 and 7, $r^7$ indicates a grid leak resistance.

In accordance with the preferred embodiment of my invention, I do not include in the leakage circuit or path the source of energy in the anode circuit of the thermionic device with whose grid or control electrode the leakage circuit or path is connected; and therefore, for the sake of brevity, in some of the appended claims, the leakage circuit or path is described as connected "directly" between the control electrode and cathode of the controlled thermionic device, to exclude from the leakage circuit or path the source of current in the anode circuit of the controlled thermionic device.

What I claim is:

1. The method of controlling thermionic discharge between anode and cathode of a thermionic device having anode, cathode and control electrode, with an unsaturated thermionic impedance comprising an anode and cathode connected in circuit directly between said control electrode and cathode of said thermionic device with the cathode of said impedance presented to said control electrode, which comprises controlling the leakage through said impedance between said control electrode and cathode of said thermionic device by controlling the temperature of said cathode of said impedance.

2. The method of controlling oscillations generated by a thermionic device comprising anode, cathode and control electrode, with a thermionic impedance comprising an anode and cathode connected in circuit directly between said control electrode and cathode of said thermionic device and exteriorly of oscillatory circuits with the cathode of said impedance presented to said control electrode, which comprises controlling the magnitude of said impedance to effect discharge therethrough from the cathode of said thermionic device to its control electrode.

3. The method of controlling oscillations generated by coupled anode and control-electrode circuits of a thermionic device comprising anode, cathode and control electrode, with a thermionic impedance comprising an anode and cathode connected in circuit directly between said control electrode and cathode of said thermionic device with the cathode of said impedance presented to said control electrode, which comprises controlling the temperature of said cathode of said thermionic impedance to control the leakage between said control electrode and cathode of said thermionic device.

4. The method of controlling oscillations generated by a thermionic device comprising anode, cathode and control electrode, with a thermionic impedance having an anode, cathode and control electrode connected in circuit directly between said control electrode and cathode of said thermionic device with the cathode of said impedance presented to said control electrode of said thermionic device, which comprises controlling the temperature of the cathode of said impedance and controlling the potential of said control electrode of said impedance.

5. The combination with a thermionic device comprising an anode, cathode and a control electrode, of an unsaturated thermionic impedance comprising an anode and cathode and connected in series directly between said control electrode and said cathode of said thermionic device and with its cathode presented to said control electrode for effecting leakage between said control electrode and cathode of said thermionic device, and means for controlling said leakage comprising means for varying the temperature of the cathode of said impedance.

6. The combination with oscillation-producing means comprising a thermionic device having an anode, cathode and control electrode, and means for coupling the anode and control electrode circuits, of a thermionic impedance comprising an anode and cathode and connected in a path directly between said control electrode and said cathode with its cathode presented to said control electrode, and means for adjusting the temperature of the cathode of said thermionic impedance.

7. The combination with oscillation-producing means comprising a thermionic device having an anode, cathode and control electrode, and means for coupling the anode and control electrode circuits, of a thermionic impedance disposed exteriorly of circuits comprising said coupling means and of such magnitude and connected directly in circuit with said control electrode in such sense as to effect a conductive leakage path between said control electrode and said cathode.

8. The combination with oscillation-producing means comprising a thermionic device having an anode, cathode and control electrode, and means for coupling the anode and control electrode circuits, of a leak circuit directly between said control electrode and said cathode and exteriorly of circuits including said coupling means, and a thermionic impedance in said leak circuit and comprising an anode and cathode with the latter presented to said control electrode.

9. The combination with a thermionic oscillator having an anode, cathode and control electrode, of a thermionic modulator comprising an anode, cathode and control electrode, and means for imparting to the control electrode of said modulator a potential derived from the control electrode of said oscillator comprising a connection from the control electrode of said oscillator to the control electrode of said modulator, and a thermionic impedance in said connection.

10. The combination with a thermionic oscillator having an anode, cathode and control electrode, of a thermionic modulator comprising an anode, cathode and control electrode, and means for imparting to the control electrode of said modulator a potential derived from the control electrode of said oscillator comprising a connection from the control electrode of said oscillator to the control electrode of said modulator, and a thermionic impedance in said connection, said thermionic impedance disposed in such sense in said connection that a negative potential is impressed upon the grid of said modulator.

11. The combination with a thermionic oscillator having an anode, cathode and control electrode, of a thermionic modulator comprising an anode, cathode and control electrode, and means for imparting to the control electrode of said modulator a potential derived from the control electrode of said oscillator comprising a connection from the control electrode of said oscillator to the control electrode of said modulator, a thermionic impedance in said connection, and a second impedance in series with said impedance between the control electrode and cathode of said oscillator.

12. The combination with a thermionic oscillator, and a plurality of modulators, each comprising an anode, cathode and a control electrode, one of said modulators controlled by another of said modulators and controlling said oscillator, of connections from the control electrode of said oscillator to the control electrodes of said modulators, and a thermionic impedance in each of said connections.

13. The combination with a thermionic oscillator, and modulators, each comprising an anode, cathode and a control electrode, of connections from the control electrode of said oscillator to the control electrodes of said modulators, and a thermionic impedance in each of said connections, said impedances connected in such sense that negative potentials are impressed upon the control electrodes of said modulators.

14. The combination with a thermionic oscillator, and modulators, each comprising an anode, cathode and a control electrode, of connections from the control electrode of said oscillator to the control electrodes of said modulators, a thermionic impedance in each of said connections, and means whereby the anode circuit of one of said modulators controls the potential of the control electrode of another of said modulators.

15. The combination with a thermionic oscillator, and modulators, each comprising an anode, cathode and a control electrode, of connections from the control electrode of said oscillator to the control electrodes of said modulators, a thermionic impedance in each of said connections, said impedances connected in such sense that negative potentials are impressed upon the control electrodes of said modulators, and means whereby the anode circuit of one of said modulators controls the potential of the control electrode of another of said modulators.

16. The combination with a thermionic oscillator, of a thermionic device, said oscillator and device each comprising an anode, cathode and a control electrode, a leak circuit from the control electrode of said oscillator to its cathode, and a thermionic impedance in said leak circuit, said impedance disposed also in a connection between the control electrode of said oscillator and thermionic device.

17. The combination with a thermionic oscillator, of a thermionic device, said oscillator and device each comprising an anode, cathode and a control electrode, a leak circuit from the control electrode of said oscillator to its cathode, a thermionic impedance and a second impedance in said leak circuit, and a connection from a point between said impedances to the control electrode of said thermionic device.

18. The combination with a thermionic oscillator, of a thermionic device, said oscillator and device each comprising an anode, cathode and a control electrode, a leak circuit from the control electrode of said oscillator to its cathode, a thermionic impedance and a second impedance in said leak circuit, a connection from a point between said impedances to the control electrode of said thermionic device, and a capacity in parallel to one of said impedances.

19. The combination with a thermionic oscillator, of a thermionic device, said oscillator and device each comprising an anode, cathode and a control electrode, a leak circuit from the control electrode of said oscillator to its cathode, a thermionic impedance and a second impedance in said leak circuit, a connection from a point between said impedances to the control electrode of said thermionic device, and a capacity in parallel with said second impedance.

20. The combination with a thermionic oscillator and a thermionic device, each comprising an anode, cathode and control electrode, of a leak circuit from the control electrode of said oscillator to another of its electrodes, a thermionic impedance in said leak circuit, a thermionic impedance and a third impedance in series with each other in parallel with said first named impedance, and a connection to the control electrode of said thermionic device from a point between said second named thermionic impedance and said third impedance.

21. The combination with a thermionic oscillator and a thermionic device, each comprising an anode, cathode and control electrode, of a leak circuit from the control electrode of said oscillator to another of its electrodes, a thermionic impedance in said leak circuit, a thermionic impedance and a third impedance in series with each other in parallel with said first named impedance, a connection to the control electrode of said thermionic device from a point between said second named thermionic impedance and said third impedance, and a capacity connected between electrodes of said thermionic impedances.

22. The combination with a thermionic oscillator and a thermionic device, each comprising an anode, cathode and control electrode, of a leak circuit from the control electrode of said oscillator to another of its electrodes, a thermionic impedance in said leak circuit, a thermionic impedance and a third impedance in series with each other in parallel with said first named impedance, a connection to the control electrode of said thermionic device from a point between said second named thermionic impedance and said third impedance, and a capacity connected in parallel with said third impedance.

23. The combination with a thermionic oscillator, modulator and amplifier, each comprising an anode, cathode and a control electrode, of a signaling instrument controlling the control electrode of said amplifier, the anode circuit of said amplifier controlling the control electrode of said modulator, and connections from the control electrode of said oscillator to the control electrodes of said modulator and amplifier, and thermionic impedance in said connection.

24. The combination with a thermionic oscillator, modulator and amplifier, each comprising an anode, cathode and a control electrode, of a signaling instrument controlling the control electrode of said amplifier, the anode circuit of said amplifier controlling the control electrode of said modulator, and connections from the control electrode of said oscillator to the control electrodes of said modulator and amplifier, and thermionic impedance in said connection, said impedance connected in such sense that the control electrodes of said modulator and amplifier are negatively charged from the control electrode of said oscillator.

25. The combination with a thermionic oscillator, modulator and amplifier, each comprising an anode, cathode and control electrode, of a leak circuit from the control electrode to the cathode of said oscillator, thermionic impedance in said leak circuit, and thermionic impedances in connections from the control electrode of said oscillator to the control electrodes of said modulator and amplifier.

26. The combination with a thermionic oscillator, modulator and amplifier, each comprising an anode, cathode and control electrode, of a leak circuit from the control electrode to the cathode of said oscillator, thermionic impedances in said leak circuit, and thermionic impedances in connections from the control electrode of said oscillator to the control electrodes of said modulator and amplifier, said impedances in said connections to the control electrodes of said modulator and amplifier being disposed in such sense that said control electrodes of said modulator and amplifier are negatively charged from the control electrode of said oscillator.

27. The combination with a thermionic oscillator, modulator and amplifier, each comprising an anode, cathode and control electrode, of a leak circuit from the control electrode to the cathode of said oscillator, thermionic impedance in said leak circuit, thermionic impedances in connections from the control electrode of said oscillator to the control electrodes of said modulator and amplifier, connections from the cathodes of said modulator and amplifier to said thermionic impedances, and an additional impedance in each of said last named connections.

28. The combination with a thermionic oscillator, modulator and amplifier, each comprising an anode, cathode and control electrode, of a leak circuit from the control electrode to the cathode of said oscillator, thermionic impedance in said leak circuit, thermionic impedances in connections from the control electrode of said oscillator to the control electrodes of said modulator and amplifier, said impedances in said connections to the control electrodes of said modulator and amplifier being disposed in such sense that said control electrodes of said modulator and amplifier are negatively charged from the control electrode of said oscillator, connections from the cathodes of said modulator and amplifier to said thermionic impedances, and an additional impedance in each of said last named connections.

29. The combination with a thermionic oscillator, modulator and amplifier, each comprising an anode, cathode and control electrode, of a leak circuit from the control electrode of said oscillator to the cathode of said oscillator, thermionic impedance in said leak circuit, thermionic impedances in connections from the control electrode of said oscillator to the control electrodes of said modulator and amplifier, connections from the cathodes of said modulator and amplifier to said thermionic impedances, an additional impedance in each of said last named connections, and a connection from the cathode of said oscillator to the cathodes of said modulator and amplifier.

30. The combination with a thermionic oscillator, modulator and amplifier, each comprising an anode, cathode and control electrode, of a leak circuit from the control electrode to the cathode of said oscillator, thermionic impedance in said leak circuit, thermionic impedances in connections from the control electrode of said oscillator to the control electrodes of said modulator and amplifier, said impedances in said connections to the control electrodes of said modulator and amplifier being disposed in such sense that said control electrodes of said modulator and amplifier are negatively charged from the control electrode of said oscillator, connections from the cathodes of said modulator and amplifier to said thermionic impedances, an additional impedance in each of said last named connections, and a connection from the cathode of said oscillator to the cathodes of said modulator and amplifier.

31. The combination with a thermionic oscillator having an anode, cathode and a control electrode and means coupling the anode and control-electrode circuits, of a second thermionic device having a control electrode, a connection between said electrodes, and a thermionic impedance comprising an anode and cathode disposed in said connection and having its cathode presented to the control electrode of said oscillator.

32. The method of producing a biasing voltage applied to the grid of a thermionic device, which comprises rectifying a current of radio frequency whose amplitude is dependent upon the control action of said grid, and applying the negative impulses of rectified current to said grid to vary its said control action.

33. The method of producing a biasing voltage applied to the grid of a thermionic device, which comprises controlling by action of said grid the amplitude of radio frequency difference of potential between anode and cathode of a second thermionic device, selecting negative impulses of said potential by asymmetrical conduction, and applying the selected impulses to said grid.

34. The combination with a thermionic device having anode, cathode and control electrode, of a radio frequency path, a second thermionic device having an anode and a cathode operatively related to said path for applying a negative biasing voltage to the control electrode of said first thermionic device.

In testimony whereof I have hereunto affixed my signature this 27th day of December, 1921.

THOMAS APPLEBY.